WILLIAM H. IVENS.
Improvement in Insertable Saw-Teeth.
No. 114,686. Patented May 9, 1871.
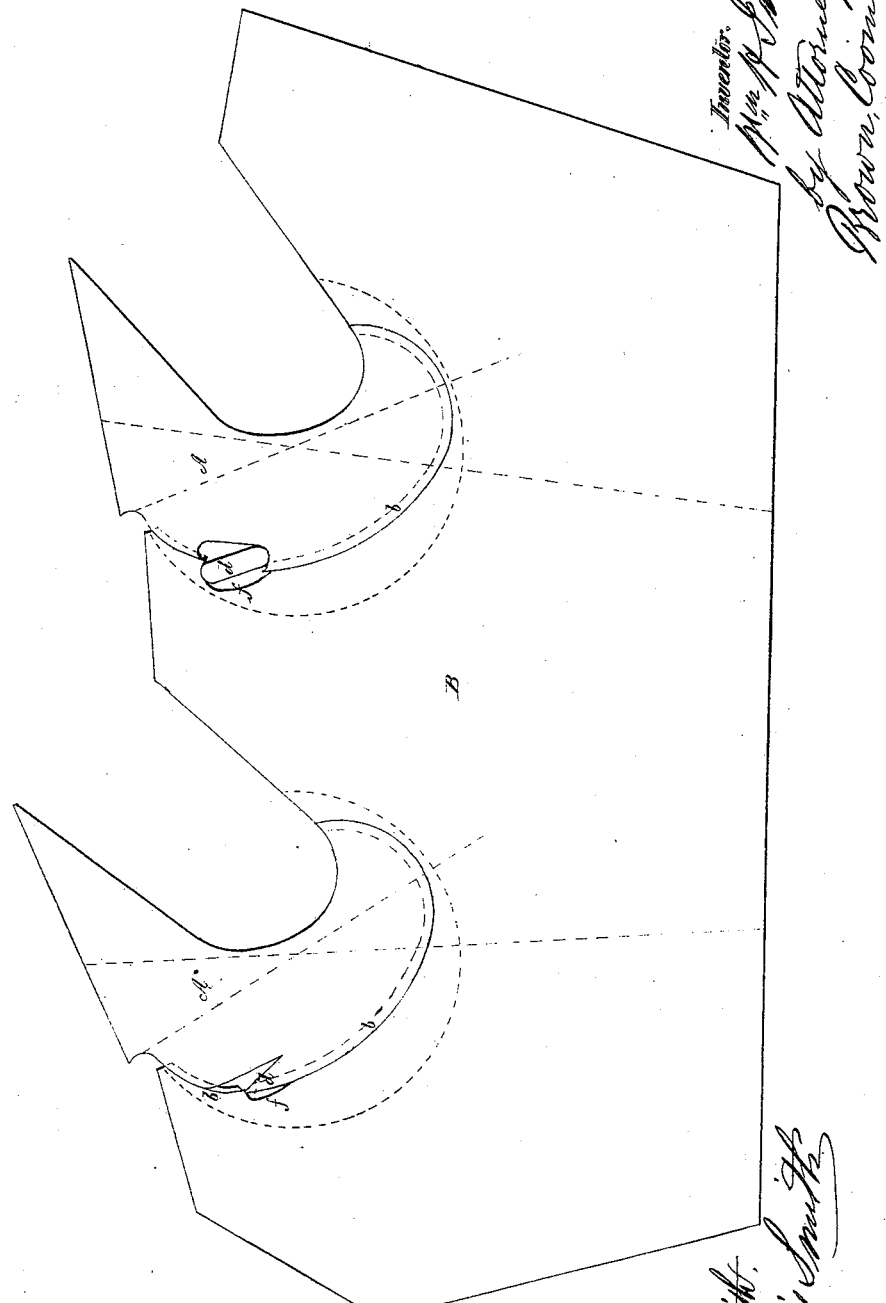

UNITED STATES PATENT OFFICE.

WILLIAM H. IVENS, OF TRENTON, NEW JERSEY, ASSIGNOR TO HIMSELF AND WILLIAM E. BROOKE, OF SAME PLACE.

IMPROVEMENT IN INSERTIBLE SAW-TEETH.

Specification forming part of Letters Patent No. 114,686, dated May 9, 1871.

*To all whom it may concern:*

Be it known that I, WILLIAM H. IVENS, of Trenton, in Mercer county, and State of New Jersey, have invented certain new and useful Improvements in Inserted Saw-Teeth; and I do hereby declare that the following is a full, clear, and exact description thereof, reference being had to the accompanying drawing, through letters of reference marked thereon, forming part of this specification, and which represents a tooth constructed according to my invention and inserted in a section of a saw-plate.

The difficulties heretofore experienced with inserted teeth have been, first, that they could not be inserted close enough or in sufficient number to admit of heavy feed without materially weakening the plate; secondly, that sufficient throat-room could not be obtained to clear the chips when made with a base small enough to admit the desired number.

To remedy these defects is the object of my invention; and it consists in constructing the base or root of the tooth of an elliptic form, of sufficient length in its major axis to prevent any tendency to revolve or wedge in its seat, and arranging the tooth proper at about right angles to the said axis, whereby a large throat is obtained, and the smallest possible space occupied by said base or root, so that a much larger number of teeth may be inserted in a plate of given diameter or length.

Referring to the drawing, A is a movable tooth, having a root of elliptic form, inserted in the saw-plate, with a V-groove, as shown in dotted lines at *b*, on the back of which is a latch or tongue, *d*, formed either in the tooth or in the plate; or an independent latch may be inserted, and its open or free end forced into the recess *f*, which holds the tooth perfectly secure in its seat.

When it is desired to remove the tooth it may be done by driving a wedge into the recesses *f*, to force the latch back to its original position.

I am aware that a tooth having a spirally-curved base or root has been patented to J. W. Strange, August 13, 1867, and reissued September 28, 1869; but, owing to its wedge form and liability to strain or split, the plate is practically objectionable. I therefore do not claim such form; but

What I claim as new, and desire to secure by Letters Patent, is—

1. A saw-tooth of elliptic form for insertion in a corresponding recess in the saw-plate, substantially as described.

2. The tongue or fastening, constructed and operating essentially as shown and described.

In testimony whereof I have signed my name to this specification in the presence of two subscribing witnesses.

WM. H. IVENS.

Witnesses:
JOHN MARGERUM,
GEO. W. THOMSON.